(12) United States Patent
Rademacher et al.

(10) Patent No.: US 11,007,540 B2
(45) Date of Patent: May 18, 2021

(54) HYDROCYCLONE

(71) Applicant: Vulco S.A., Santiago (CL)

(72) Inventors: Marcelo Rademacher, Lane Cove North (AU); Nestor Cinotti, Elanora Heights (AU)

(73) Assignee: Vulco S.A.

( * ) Notice: Subject to any disclaimer, the term of this patent is extended or adjusted under 35 U.S.C. 154(b) by 0 days.

(21) Appl. No.: 16/329,867

(22) PCT Filed: Sep. 2, 2017

(86) PCT No.: PCT/AU2017/050950
§ 371 (c)(1),
(2) Date: Mar. 1, 2019

(87) PCT Pub. No.: WO2018/039742
PCT Pub. Date: Mar. 8, 2018

(65) Prior Publication Data
US 2019/0232303 A1 Aug. 1, 2019

(30) Foreign Application Priority Data

Sep. 2, 2016 (AU) .................... 2016903534

(51) Int. Cl.
| | | |
|---|---|---|
| *B04C 5/04* | (2006.01) | |
| *B01D 21/26* | (2006.01) | |
| *B03D 1/14* | (2006.01) | |
| *B04C 5/12* | (2006.01) | |
| *B04C 5/10* | (2006.01) | |

(Continued)

(52) U.S. Cl.
CPC .............. *B04C 5/04* (2013.01); *B01D 21/267* (2013.01); *B03D 1/1425* (2013.01); *B04C 5/10* (2013.01); *B04C 5/12* (2013.01); *B03D 1/085* (2013.01); *B04C 2009/008* (2013.01)

(58) Field of Classification Search
CPC .... B04C 5/04; B04C 5/12; B04C 5/10; B04C 2009/008; B04C 1/00; B03D 1/085; B01D 21/267
See application file for complete search history.

(56) References Cited

U.S. PATENT DOCUMENTS 2,418,381 A * 4/1947 Wegmann ................ B04C 1/00
  55/395
4,279,743 A 7/1981 Miller
(Continued)

FOREIGN PATENT DOCUMENTS

EP 0485355 A1 5/1992

*Primary Examiner* — Liam Royce
(74) *Attorney, Agent, or Firm* — Morriss O'Bryant Compagni Cannon, PLLC.

(57) ABSTRACT

A hydrocyclone (10) is disclosed which includes an internal conical separation chamber (15) which extends axially from a first end to a second end of relatively smaller cross-sectional area than the first end. The separation chamber (15) includes at least one gas inlet device (60) which comprises a plurality of openings in the form of a series of elongate slits (82) arranged in a spaced-apart relationship from one another around an interior circumferential wall (80) of the gas discharge chamber (74). In use the slits (82) are arranged for admission of gas into the separation chamber (15) at a region located between the first and second ends.

14 Claims, 6 Drawing Sheets

(51) Int. Cl.
  *B04C 9/00* (2006.01)
  *B03D 1/08* (2006.01)

(56) References Cited

U.S. PATENT DOCUMENTS

| | | | |
|---|---|---|---|
| 4,765,887 A * | 8/1988 | Lister | B04C 5/08 |
| | | | 209/727 |
| 4,876,016 A | 10/1989 | Young et al. | |
| 5,131,980 A | 7/1992 | Chamblee et al. | |
| 5,662,790 A | 9/1997 | Carlton et al. | |
| 6,146,525 A * | 11/2000 | Li | B01D 17/0205 |
| | | | 210/221.2 |

* cited by examiner

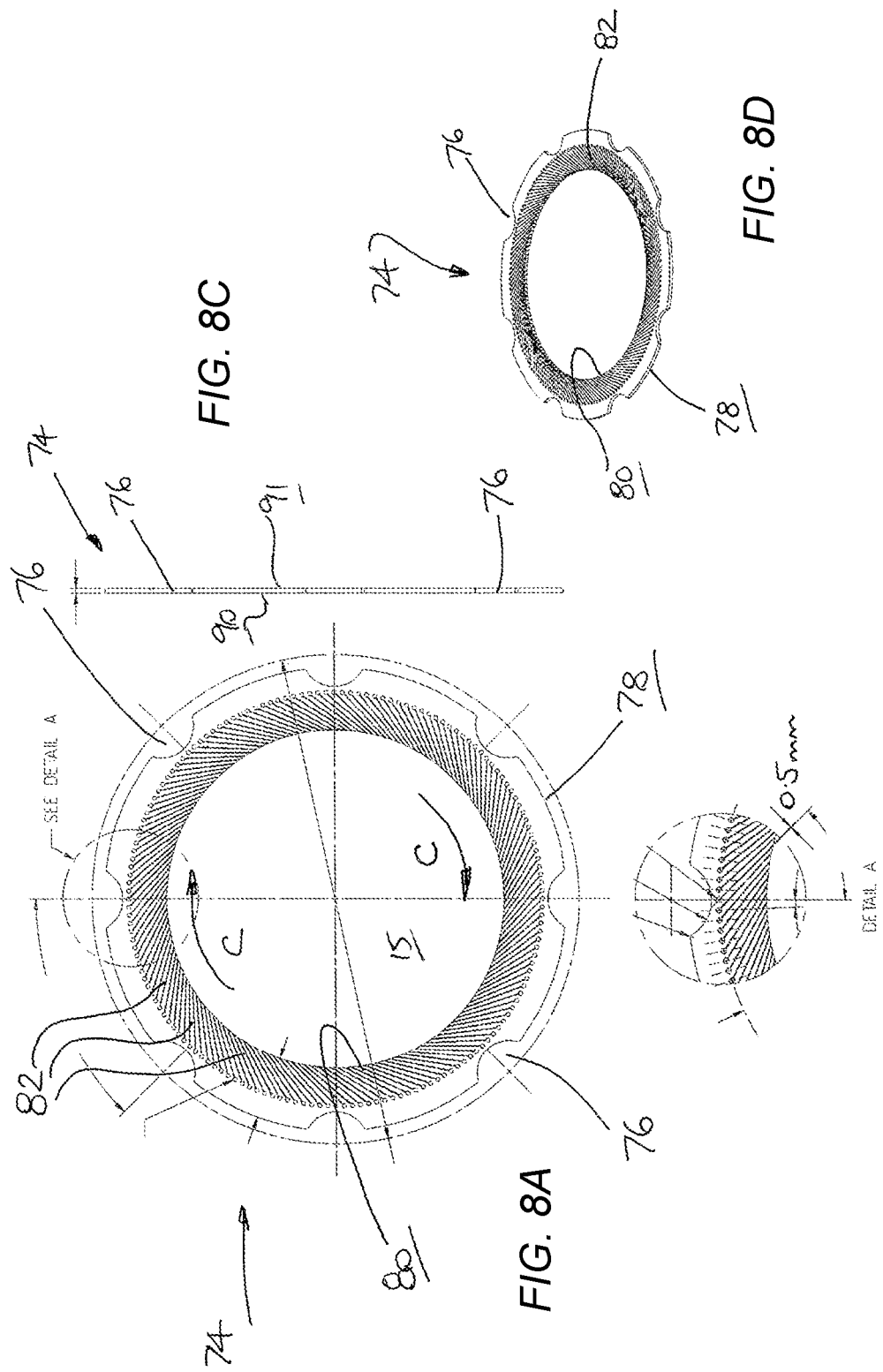

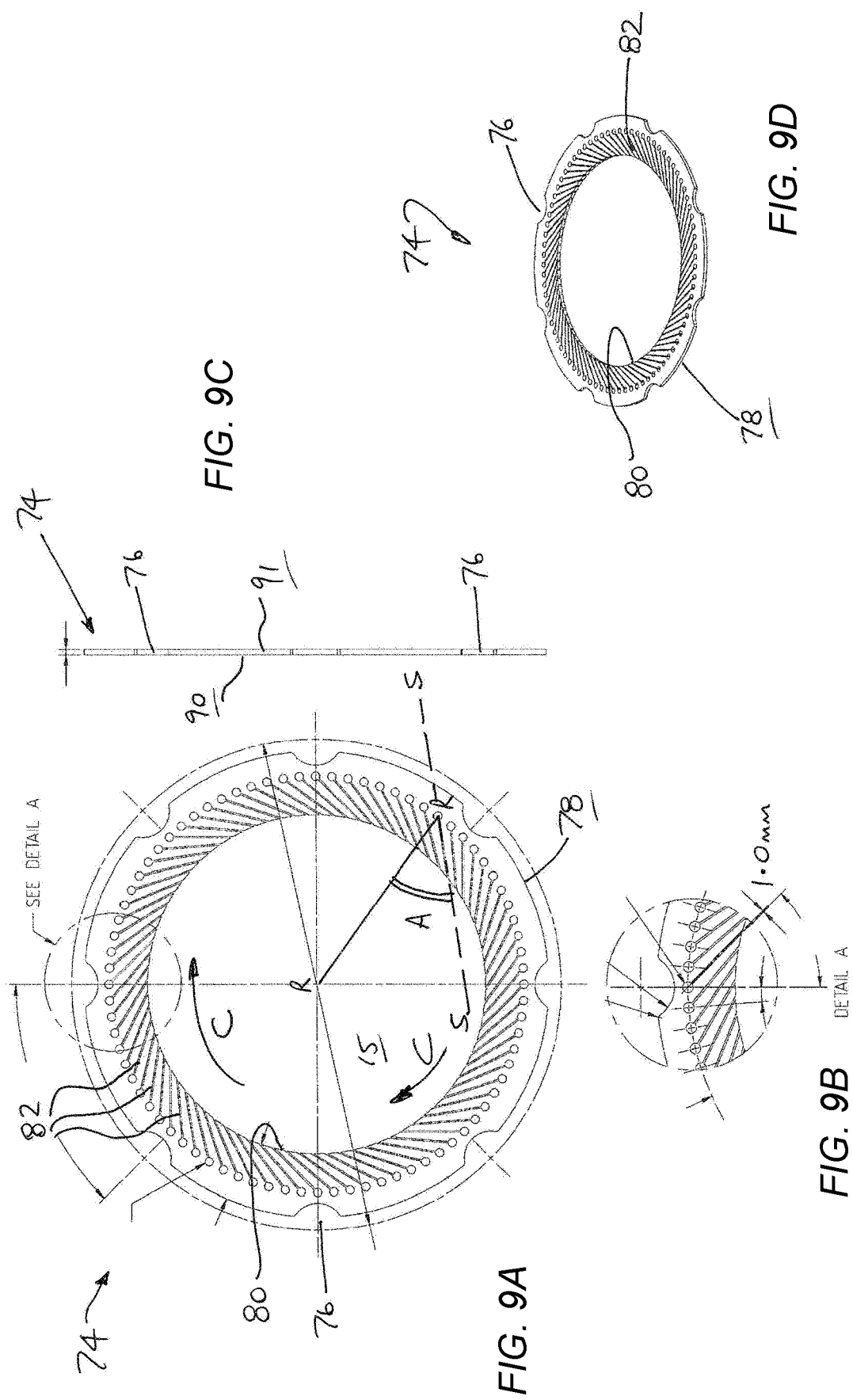

HYDROCYCLONE

TECHNICAL FIELD

This disclosure relates generally to hydrocyclones and more particularly, but not exclusively, to hydrocyclones suitable for use in the mineral and chemical processing industries. The disclosure is also concerned with a modification of the design and operation of a hydrocyclone as a means of optimising both its performance, and the performance of operatively connected minerals processing equipment.

BACKGROUND OF THE DISCLOSURE

Hydrocyclones are used for separating suspended matter carried in a flowing liquid, such as a mineral slurry, into two discharge streams by creating centrifugal forces within the hydrocyclone as the slurry passes through a conical shaped chamber. Basically, hydrocyclones include a conical separating chamber, a feed inlet which is usually generally tangential to the axis of the separating chamber and is disposed at the end of the chamber of greatest cross-sectional dimension, an underflow outlet at the smaller end of the chamber, and an overflow outlet at the larger end of the chamber.

The feed inlet is adapted to deliver the slurry into the hydrocyclone separating chamber, and the arrangement is such that the heavy (for example, denser and coarser) matter tends to migrate towards the outer wall of the chamber and towards and out through the centrally located underflow outlet. The lighter (less dense or finer particle sized) material migrates towards the central axis of the chamber and out through the overflow outlet. Hydrocyclones can be used for separation by size of the suspended solid particles or by particle density. Typical examples include solids classification duties in mining and industrial applications.

For enabling efficient operation of hydrocyclones the internal geometric configuration of the larger end of the chamber where the feed material enters, and of the conical separating chamber are important. In normal operation such hydrocyclones develop a central air column, which is typical of most industrially-applied hydrocyclone designs. The air column is established as soon as the fluid at the hydrocyclone axis reaches a pressure below the atmospheric pressure. This air column extends from the underflow outlet to the overflow outlet and simply connects the air immediately below the hydrocyclone with the air at the top. The stability and cross-sectional area of the air core is an important factor in influencing the underflow and overflow discharge condition, to maintain normal hydrocyclone operation.

During normal "stable" operation, the slurry enters through an upper inlet of a hydrocyclone separation chamber in the form of the inverted conical chamber to become separated cleanly. However, the stability of a hydrocyclone during such an operation can be readily disrupted, for example by collapse of the air core due to overfeeding of the hydrocyclone, resulting in an ineffective separation process, whereby either an excess of fine particulates exit through the lower outlet or coarser particulates exit through the upper outlet. If coarser particles report in the overflow stream, it will be detrimental to the downstream classification processes.

Another form of unstable operation is known as "roping", whereby the rate of solids being discharged through the lower outlet increases to a point where the flow is impaired. If corrective measures are not timely adopted, the accumulation of solids through the outlet will build up in the separation chamber, the internal air core will collapse and the lower outlet will discharge a rope-shaped flow of coarse solids.

Unstable operating conditions can have serious impacts on downstream processes, often requiring additional treatment (which, as will be appreciated, can greatly impact on profits) and also result in accelerated equipment wear. Hydrocyclone design optimisation is desirable for a hydrocyclone to be able to cope with changes to the composition and viscosity of input slurry, changes in the flowrate of fluid entering the hydrocyclone, and other operational instabilities.

SUMMARY

In a first aspect, a hydrocyclone is disclosed including: a body enclosing a separation chamber which is generally conical in shape and which extends axially from a first end to a second end of relatively smaller cross-sectional area than the first end; and the separation chamber including at least one gas inlet, said inlet comprising a plurality of openings arranged in a spaced-apart relationship from one another around an interior circumferential wall of said chamber, in use the openings for admission of gas into the chamber at a region located between the first and second ends.

The admission of gas into the hydrocyclone chamber has been found to produce some metallurgically beneficial outcomes during its operation, as measured by various standard classification parameters. These beneficial outcomes include a reduction both in the amount of water, and in the amount of fine particles, which bypass the classification step and which are improperly carried away in the cyclone coarse particle underflow discharge stream, rather than reporting to the fine particle overflow stream as should be the case during optimal cyclone operation. Also observed was a reduction in the average particle cut size (d50%) in the overflow stream from the classification step, as a consequence of more fine particles now reporting to the fine particle overflow stream.

The inventors surmise that gas flowing into the cyclone separation chamber assists in the separation of fine particles from coarser particles by elutriation, can enable operational advantages in related processes. For example, the effect of the input of gas into the hydrocyclone during its operation can lead to an improvement in the recovery performance in a downstream flotation process. An increase in the amount of fine particles in the flotation feed can lead to better liberation and flotation separation of valuable materials in a subsequent process step. Also, reducing the amount of recirculating load of particle material in the milling and cyclone separation circuit can avoid overgrinding of particles which are already sufficiently finely ground, as well as increasing the capacity of the grinding circuit because unnecessary regrinding wastes energy in the milling circuit. Overall the inventors expect that the use of gas in the hydrocyclone separation step will maximise throughput of product in terms of, for example, tonnage per hour, and maintain the physical separation process parameters at a stable level.

In some embodiments, the separation chamber comprises at least two sections of the body, and the at least one gas inlet is located between the sections. In a further embodiment, the at least one gas inlet admits gas at the second end of the separation chamber.

In some embodiments, the gas inlet comprises an annular gas receiving device. In one particular embodiment, the gas inlet further comprises a gas discharge device which is in fluid communication with the gas receiving device and also with the separation chamber. In one form of this, the gas discharge device is annular in shape.

In some embodiments, the interior circumferential wall of the gas discharge device has a plurality of openings via which gas flows into the chamber in use. In one form of this, the openings are slits formed in the interior circumferential wall.

In some embodiments, the slits are elongate, and extend from the interior circumferential wall into the annular body of the gas discharge device. In one particular embodiment, each slit is arranged in generally parallel alignment with an adjacent slit.

In some embodiments, an angle is defined between an axis of each elongate slit, and a radial line which extends from a point at the centre axis of the gas discharge device to a point at a terminal end of the slit which is located within the annular body. In one particular embodiment, said angle is an acute angle. In one form of this, said angle is about 45 angle degrees.

In some embodiments, each elongate slit is oriented at an angle such that, in use, when a flow of gas is discharged from the gas discharge device and into the separation chamber, the direction of discharge of said flow is generally aligned with a rotational, or spiral, flow of feed materials moving tangentially around the interior circumferential wall of the separation chamber.

In some embodiments, at least some of said slits have parallel sides to define a substantially constant transverse width. In one particular embodiment, the transverse width of said slits is equivalent to the width of said openings via which gas flows into the chamber in use.

In some embodiments, the interior circumferential wall of the gas discharge device is aligned flush with an adjacent portion of the interior surface of the separation chamber.

In some embodiments, the openings in the interior circumferential wall of the gas discharge device are arranged substantially evenly spaced apart therearound.

In some embodiments, the gas receiving device is operatively connected to a source of inlet gas.

In some embodiments, the gas receiving vessel and the gas discharge vessel are positioned between two adjacent sections of the body by a pair of gaskets.

In some embodiments, the gas used is air, from a source of compressed air.

In a second aspect, there is disclosed a gas inlet device for use with a hydrocyclone, the device including at least one annular shaped member which is provided with a plurality of gas flow openings arranged in a spaced-apart relationship from one another around an interior circumferential wall of said member, said openings being arranged in use to admit gas into an interior chamber of the hydrocyclone when fitted thereto.

In some embodiments, the gas inlet device comprises an annular-shaped gas receiving device, and a gas discharge device which, when in use, is in fluid communication with both the gas receiving device, and also with the interior chamber via said openings.

In some embodiments, the gas discharge device is annular in shape.

In some embodiments, the openings are slits formed in the interior circumferential wall.

In some embodiments, the slits of the second aspect are otherwise as defined in the first aspect.

In some embodiments, the gas receiving device is operatively connectable to a source of inlet gas. In some embodiments, the gas used is air, from a source of compressed air.

In some embodiments, the gas receiving device has one or more side ports on an outer peripheral wall thereof which are connectable to gas conduits.

In some embodiments, when fitted to the hydrocyclone in use, an interior circumferential wall of the gas discharge device is aligned flush with an adjacent portion of a side wall of the interior chamber.

In some embodiments, the at least one annular shaped member is arranged between a pair of annular gaskets which are arranged to extend over the end faces of the said annular shaped member.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE FIGURES

The accompanying drawings facilitate an understanding of the various embodiments which will be described:

FIG. 8A is a plan view of a gas discharge device which forms part of a gas inlet device in accordance with the embodiment shown in FIG. 5, in turn for use with a hydrocyclone in accordance with the embodiment shown in FIG. 1. In this embodiment, the outlet gas slits were of fixed width of 1.0 mm;

FIG. 8B is a detail view of an upper portion of the gas discharge device of FIG. 8A;

FIG. 8C is a side end view of the gas discharge device of FIG. 8A;

FIG. 8D is a perspective, upper view of the gas discharge device of FIG. 8A;

FIG. 9A is a plan view of a further embodiment of a gas discharge device which forms part of a gas inlet device in accordance with the embodiment shown in FIG. 5, in turn for use with a hydrocyclone in accordance with the embodiment shown in FIG. 1. In this embodiment, the outlet gas slits were of fixed width of 2.0 mm;

FIG. 9B is a detail view of an upper portion of the gas discharge device of FIG. 9A;

FIG. 9C is a side end view of the gas discharge device of FIG. 9A;

FIG. 9D is a perspective, upper view of the gas discharge device of FIG. 9A;

DETAILED DESCRIPTION

This disclosure relates to the design features of a hydrocyclone of the type that facilitates separation of a solid-liquid mixture into two phases of interest. The hydrocyclone has a design which enables a stable operation, with maximised throughput and good physical separation process parameters.

Figure 1:
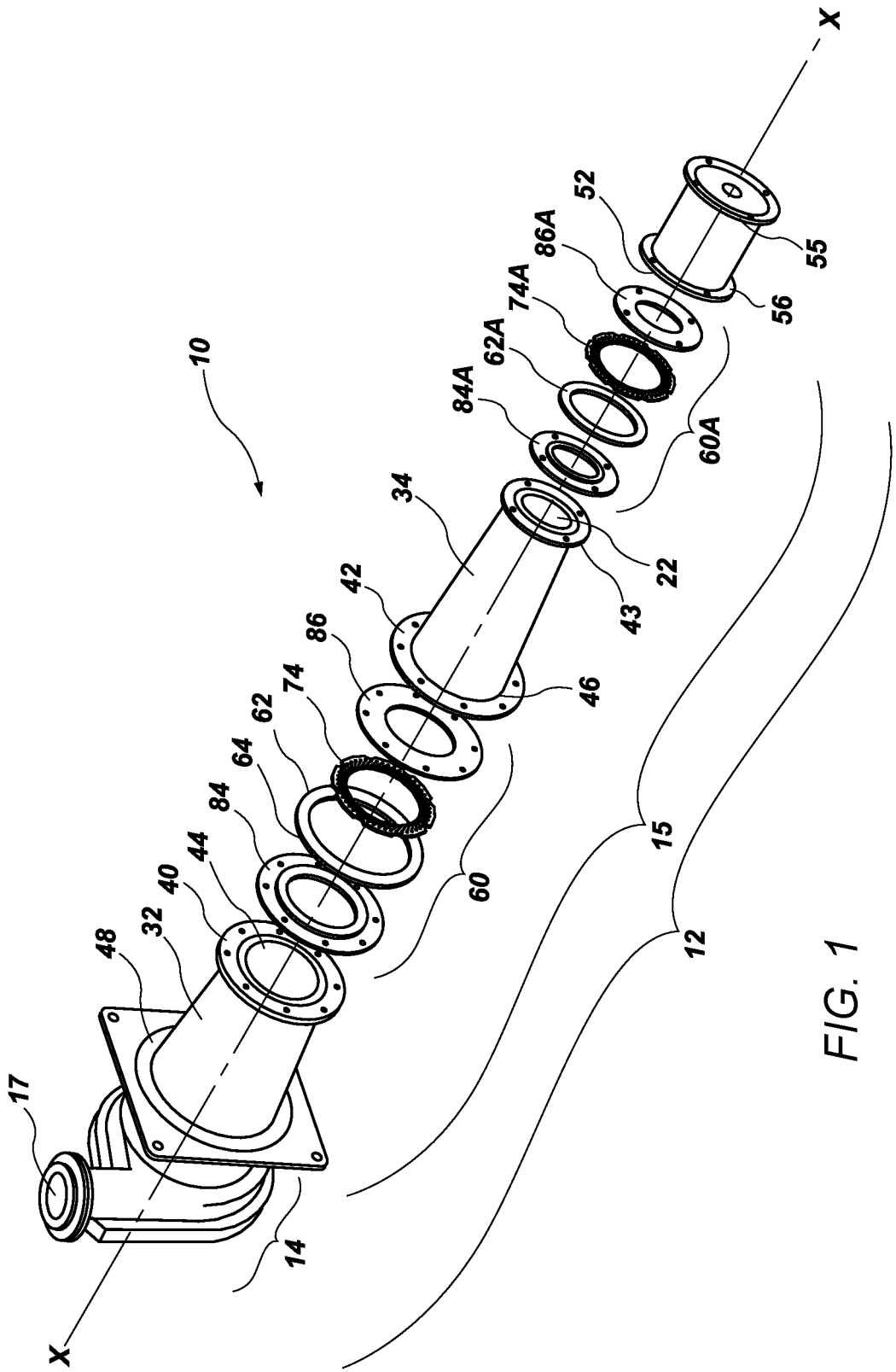
FIG. 1 is an exploded, schematic view of a hydrocyclone in accordance with a first embodiment of the present disclosure.

A hydrocyclone, when in use, is normally orientated with its central axis X-X being disposed upright, or close to being upright. With reference to FIG. 1, there is shown an exploded schematic of a hydrocyclone 10 comprising a main body 12 having a chamber 13 defined therein. The chamber 13 includes an inlet (or feed) chamber 14 and a conical separation chamber 15. The hydrocyclone 10 includes a cylindrical feed inlet port 17 of circular cross-section, in use for feeding a particle-bearing mixture in the form of a particulate slurry into the inlet feed chamber 14 portion of the chamber 13.

The conical separation chamber 15 of the hydrocyclone 10 includes two segments 32, 34 each being of a frustoconical shape, and joined together end to end by nuts 36 and bolts 38 located at mating circumferential flanges 40, 42 arranged at a respective end of the two frustoconical segments 32, 34. The two frustoconical segments 32, 34 are of similar shape but one 32 is larger than the other 34, such that the narrowest end internal diameter 44 of the largest segment 32 is similar to the largest end internal diameter 46 of the smaller segment 34. Also, the largest end internal diameter 48 of the largest segment 32 is similar to the diameter of the lowermost open end region 30 of the inlet section 14.

Joining the two frustoconical segments 32, 34 end-to end forms a generally conical separation chamber 15 having a central axis X-X, and which is joined at its uppermost in use end to the lowermost open end 30 of the adjacent feed chamber 14, to form the main body 12 of the hydrocyclone 10.

In the embodiment shown in the Figures, the separation chamber 15 also includes a gas inlet device 60 which in use admits gas into the chamber at a region located between the two frustoconical segments 32, 34. Such a gas inlet device 60 can be sold and supplied separately for retrofitting to an existing hydrocyclone conical section, or as part of a new hydrocyclone kit. While the embodiments shown in the drawings indicate that the gas inlet device 60 is a discrete element which is attached or fastened between the frustoconical segments 32, 34, in further embodiments the gas inlet device can also be formed as an integral part of the end region of one or the other of the frustoconical segments 32, 34. It is within the scope of this disclosure that the area at the open centre of the gas inlet device 60 thus forms a part of the separation chamber 15, whether the gas inlet device 60 be discrete or formed as part of one of the components 32, 34.

As shown in the Figures, the gas inlet device 60 includes an annular or donut-shaped gas receiving chamber 62 which has a plurality of externally-facing gas inlet ports 64 located at the outer circumferential wall 66 thereof, to which gas inlet lines or hoses 68 are screwingly connected. In use, these hoses 68 and externally-facing ports 64 admit gas into the hollow interior of the donut-shaped chamber 62, which itself acts as a manifold to equalise the pressure and flow of gas coming from the various gas inlet hoses 68. The donut-shaped chamber 62 also has a series of internally facing gas outlet ports 70, located at the inner circumferential wall 72 thereof, via which gas flows from the interior of the gas receiving chamber 62 to a gas discharge chamber 74, as will now be described.

The gas inlet device 60 also includes an annular or donut-shaped gas discharge chamber 74 which is formed from two parallel layers of overlaid thin metal sheets 90, 91, for example made of material such as stainless steel. The discharge chamber 74 which is so defined has a plurality of gas inlet ports 76 located on the outer circumferential wall 78 thereof, which in use are aligned with the respective internally-facing gas outlet ports 70 of the gas receiving chamber 62. The inner circumferential diameter of the gas receiving chamber 62 is concentric with the outer circumferential diameter of the gas discharge chamber 74, with the respective walls 72, 78 placed in a close facing relationship. A semi-circular shaped cut-out or indent is found at eight locations around the circumferential wall 78 of the gas discharge chamber 74, and each of these cut-outs forms the gas inlet ports 76, which in use are aligned in use with the gas outlet ports 70 of the gas receiving chamber 62. The use of a wide, semi-circular cut-out facilitates easier alignment with the gas outlet ports 70 during assembly of the parts of the gas inlet device 60.

In use, gas flows from the internally-facing gas outlet ports 70 of the gas receiving chamber 62 and directly into the ports 76 located on the outer circumferential wall 78 of the gas discharge chamber 74. The inner circumferential wall or edge 80 of the gas discharge chamber 74 is formed circular in shape, and features a series of elongate slits 82 which extend inwardly for some distance from the interior circumferential wall 80 into the annular body of the gas discharge chamber 74. These slits 82 can be seen more clearly in FIGS. 8A, 8B and 8D, and also in FIGS. 9A, 9B and 9D.

Referring to FIGS. 8A, 8B and 8D, each slit 82 is shown as being arranged in generally parallel alignment with an adjacent slit 82. There is no specific limit as to how many slits 82 there can be around the inner circumferential wall 80 of the gas discharge chamber 74, nor how far from one another that these slits 82 can be spaced apart, although the structural integrity of the material which forms the discharge chamber 74 is relevant to this determination. In the case of a stainless steel discharge chamber 74, the slits 82 may be laser cut for accuracy, and so as to be able to have a pre-determined outlet diameter, in most cases of a fixed width therealong as shown in the drawings. In the example shown in FIGS. 8A, 8B and 8D, each slit 82 is shown with a 0.5 mm width, and evenly spaced apart from the next adjacent slit 82 (see FIG. 8B). In the example shown in FIGS. 9A, 9B and 9D, each slit 82 is shown with a 1.0 mm width (see FIG. 9B) and evenly spaced apart from the next adjacent slit 82.

The open end of each of these slits 82 faces the interior of the conical separation chamber 15 of the hydrocyclone 10, and gas is released via these slits 82 thereinto. The slits 82 can be arranged evenly spaced around the inner circumferential wall, as shown in the drawings, or in other spaced-apart arrangements as required. The use of slits 82 means that the gas is released in the form of a series of small bubbles, which are continuously formed at, and then released from, the end opening of each slit 82. As a consequence, the formed bubble size will depend on the selected outlet diameter of the slits 82 at the point of discharge when facing into the conical separation chamber 15.

As shown in FIG. 9A, when a radial line R-R is drawn from a point at the centreline axis of the gas discharge device 74 to extend to a point at a terminal end of the slit 82 (the end which is located within the annular body of the gas discharge chamber 74), the elongate axis of each slit 82, shown by the line S-S, is subtended from the radial line R-R by an acute angle A of about 45 angle degrees. In fact, this indicates that at the location of the open end of the slits 82, the flow of gas released therefrom is oriented almost tangential to the shape of the inner circumferential wall 80 of the gas discharge device 74 at that point. In practice this means that, when a flow of gas is discharged from the slits 82 and into the conical separation chamber 15, the direction of discharge of that gas flow is aligned with (or is generally parallel with) the rotational, or spiral, flow stream of feed materials as it moves around the interior circumferential wall of the separation chamber 15 of the hydrocyclone 10, as indicated by the directional Arrow C. In a sense, the rotational flow stream of slurry material which already has developed a flow momentum in a certain direction, will draw the tangential flow of gas bubbles into it. Furthermore, the orientation of the slits 82 pointing in that same direction as the flow of slurry means that the slits 82 will not become blinded by the slurry particles, or damaged, or afflicted by scale formation, or be subjected to fine particle aggregation and adherence, which can arise in combination with some of the chemicals that are typically present in minerals processing plant water (collectors, flocculants, and the like).

The inventors also believe that other operational advantages may arise from using the present configuration of an angled or tangential orientation of gas inlet slits, in comparison with (i) the direct introduction of a gas into the hydrocyclone by means of a wider mouth inlet (such as a gas pipe or valve projecting into the hydrocyclone interior) or (ii) the use of a gas inlet (such as a frit, bubbler or sintered metal sparger), either projecting into the hydrocyclone, or mounted at an interior wall thereof. The inventors believe that the use of any radially-oriented gas opening, or other form of inlet which will release gas in a flow pattern which is perpendicular to the hydrocyclone wall, will generate turbulence in the region of the wall of the conical section. This is because the air which is injected or introduced in such a manner will not follow the natural rotational flow motion of the slurry, which moves tangential the interior of the wall of the conical section. The creation of turbulence in such a situation will only disrupt the separation process occurring in the hydrocyclone, and ultimately serve to decrease its efficiency.

In other embodiments, the slits need not all be the same shape, for example, only some of said slits may have parallel sides to define a substantially constant transverse width, and others may not. In some embodiments, the transverse width of the slits is equivalent to the width of the outlet openings of the slit at the point of discharge, facing into the conical separation chamber 15, whereas in other embodiments, the slits may narrow or widen at the point of discharge. The slits may also be spaced apart from one another in different spatial arrangements around the interior circumferential wall 80 of the gas discharge chamber 74, unlike the even spacing seen around the wall 80 which can be seen in FIGS. 8A and 9A, for example.

The inner circumferential wall 80 of the gas discharge chamber 74 at the location of the radial slits 82 which face the chamber 13 of the hydrocyclone 10 is arranged to be aligned flush with an adjacent portion of an interior surface of the frustoconical segments 32, 34, which may, for example, be rubber lined. This means that the inlet gas bubbles are released from a circumferential ring of radial slits 82 which are located right at the internal walls of the hydrocyclone 10.

Throughout this specification, when the term "slit" is used it should be given a broad interpretation to also include other terms in use, for example "channels", "gaps" and "slots". A "slit" in this specification can refer to an elongate opening which tapers in width over its length (and can be generally widening or narrowing, or both). A "slit" can also refer to elongate openings which have opposing side walls which are parallel (as is more usually associated with the use of the word "slot"). A "slit" can also refer to other shapes or sizes of opening, which may not be symmetrical or of a standard geometric shape, and even to openings using form terminology such as "channels", or "gaps".

The gas inlet device 60 is positioned in use between the two adjacent frustoconical segments 32, 34, by a pair of like metallic discs 84, 86 which are surface coated with rubber, and which function as a gasket to clamp the gas receiving chamber 62 and the gas discharge chamber 74 therebetween, with one disc 84, 86 facing a respective one each of the mating circumferential flanges 40, 42 which are arranged at respective ends of the two frustoconical segments 32, 34. The nuts 36 and bolts 38 which secure the flanges 40, 42 also secure the rubber coated discs 84, 86 in position which, in turn centres the position of the gas inlet device 60.

Figure 2:
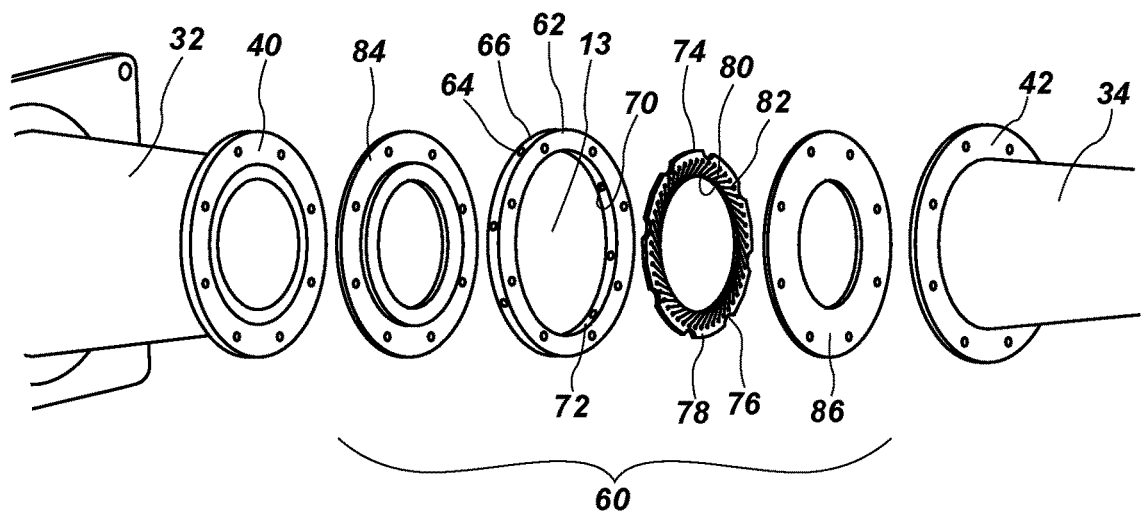
FIG. 2 is a schematic perspective view of a portion of the hydrocyclone in accordance with FIG. 1.
Figure 3:
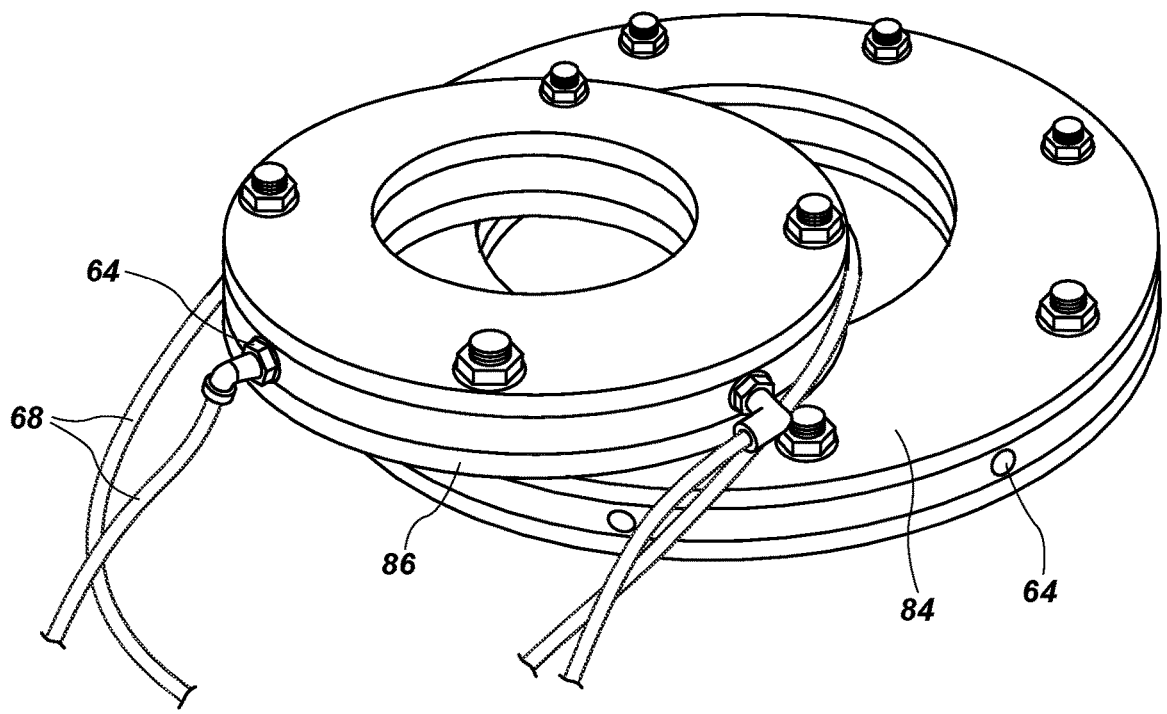
FIG. 3 is a perspective view of a gas inlet device suitable for use with a hydrocyclone (by being fitted to a feed chamber of the hydrocyclone), in accordance with a further embodiment of the present disclosure.
Figure 4:
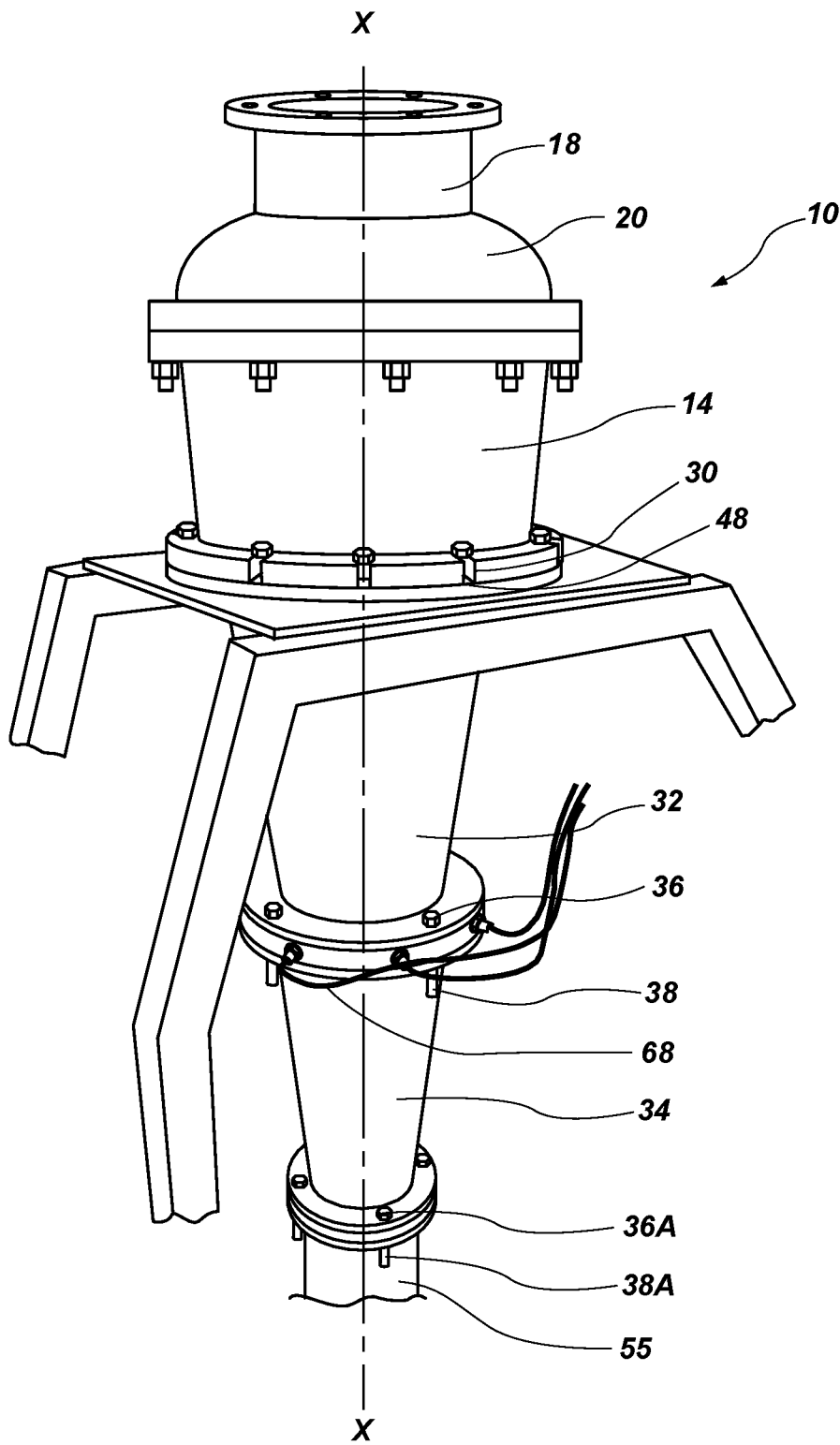
FIG. 4 is a perspective view of the gas inlet device of FIG. 3 in combination with a hydrocyclone), in accordance with a further embodiment of the present disclosure.
Figure 5:
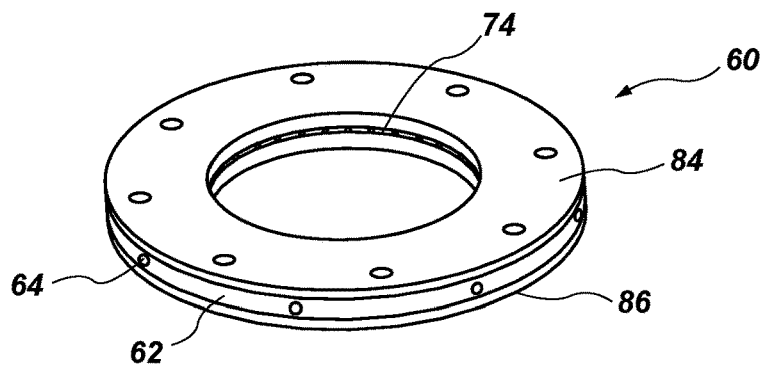
FIG. 5 is a schematic perspective, upper view of a gas inlet device for use with a hydrocyclone in accordance with the embodiment shown in FIG. 1.
Figure 6:
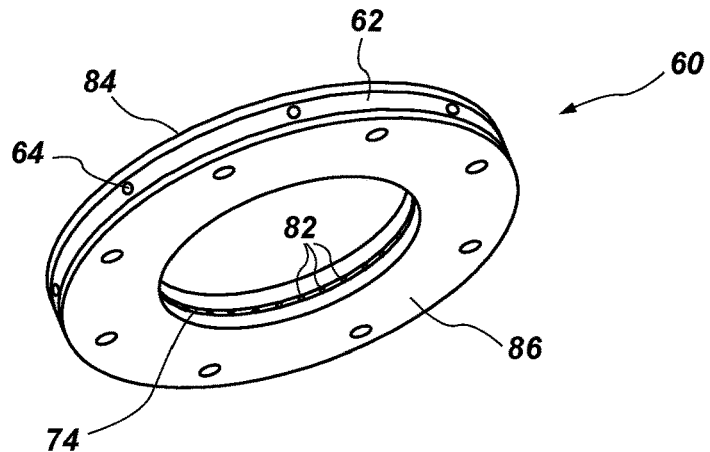
FIG. 6 is a schematic perspective, lower view of the gas inlet device of FIG. 5.
Figure 7:
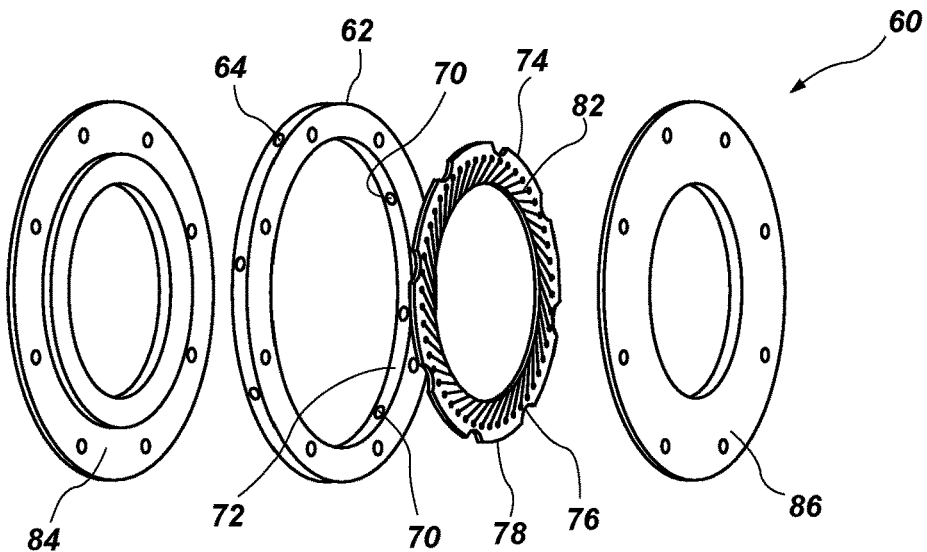
FIG. 7 is an exploded, schematic, perspective side view of the gas inlet device of FIG. 5.

In the embodiment shown in the Figures, the separation chamber 15 also includes a second gas inlet device 60A which in use admits gas into the chamber 13 at a region located between the lowermost frustoconical segment 34, and an end discharge section of the hydrocyclone 10 known as a spigot 55, which is circular in cross-section and which has an inlet opening 52 which is joined in use to the circular, open-end outlet 22 of the smaller frustoconical segment 34 of the separation chamber 15. The spigot 55 also has a central axis X-X and is generally axially aligned with the separation chamber 15 of the hydrocyclone 10. The spigot 55 is joined to the frustoconical segment 34 by way of nuts and bolts located at mating circumferential flanges, one flange 56 arranged at an upper end of spigot 55, and the other flange 43 being adjacent to the outlet end 22 of the frustoconical segment 34. In all other respects, the gas inlet device 60A shown in this lowermost position is constructed the same as the gas inlet device 60 already described and numbered in relation to FIG. 2, and so like parts have been shown in the Figures using like numerals, with the suffix "A".

As was the case previously, although the second gas inlet device 60A is shown as a discrete device which is attached or fastened between the frustoconical segment 34 and the spigot 55, in further embodiments the second gas inlet device can be formed either as an integral part of an outlet end 22 of the frustoconical segment 34, or even as a part of an upper end of the spigot 55. It is within the scope of this disclosure that the area at the open centre of the second gas inlet device 60A thus forms a part of the separation chamber 15, whether the second gas inlet device 60A be discrete or formed as part of one of the components 34, 55.

An overflow outlet (hereafter "upper outlet") 18 is centrally located in the upper (top) wall 20 of the chamber 13, the overflow outlet 18 used for discharge of a first one of the phases. Typically, this overflow outlet 18 is in the form of a cylindrical, short length of pipe and is known as a vortex finder, which both projects outwardly from the upper wall 20, and also extends from the upper wall 20 into the interior of the chamber 13 of the inlet section 14.

In the hydrocyclone 10 in use, underflow material exits the chamber 13 when it enters the spigot 55, which is a further section of the hydrocyclone 10 in the form of a cylindrical length of pipe, itself having an inlet 52 opening of similar diameter and mating cross-section with the internal diameter of the circular, open-end outlet 22 of the smaller frustoconical segment 34.

The hydrocyclone 10 is arranged in use to generate an internal gas core around which the slurry circulates. During stable operation, the hydrocyclone 10 operates such that a lighter solid phase of the slurry is discharged through the uppermost overflow outlet 18 and a heavier solid phase is discharged through the spigot 55. The internally-generated gas core runs the length of both the inlet chamber 14 and the conical separation section 15. The underflow outlet 22, vortex finder, and overflow outlet 18 are generally axially aligned along the central axis X-X of the hydrocyclone 10.

Experimental Results

Experimental results have been produced by the inventors to assess the best equipment configuration in order to produce metallurgically beneficial outcomes during the operation of the hydrocyclone, in comparison with the baseline case (without the new configuration).

Tables 1-1 and 1-2 show the results of various experiments in which a gas inlet device 60A is located at a hydrocyclone body in a lowermost position (that is, between the lowermost frustoconical segment 34 and the spigot 55), a gas inlet device 60 is located at a hydrocyclone body in an uppermost position (that is, between the two frustoconical segments 32, 34 of the hydrocyclone), and in both the lowermost and an uppermost position (that is, between each of the frustoconical sections 32, 34, and also between the lowermost frustoconical segment 34 and the spigot 55).

The parameters which were calculated included: the percentage (%) change in the amount of water bypass (WBp); and the percentage (%) change in the amount of fine particles (Bpf) which bypass the classification step. In a poorly-operating hydrocyclone, some water and fine particles are improperly carried away in the cyclone coarse particle underflow (oversize) discharge stream, rather than reporting to the fine particle overflow stream, as should be the case during optimal cyclone operation. The parameters WBp and Bpf provide a measure of this.

Also observed was the percentage (%) change in the average particle cut size (d50) in the overflow stream from the classification step, as a measure of whether more or less fine particles reported to the fine particle overflow stream. Particles of this particular size d50, when fed to the equipment, have the same probability of reporting to either the underflow or to the overflow.

Also observed was a quantification of the efficiency factor of classification of the hydrocyclone, in comparison with a calculated 'ideal classification'. This parameter alpha (a) represents the acuity of the classification. It is a calculated value, which was originally developed by Lynch and Rao (University of Queensland, JK Minerals Research Centre, JKSimMet Manual). The size distribution of particulates in a feed flow stream is quantified in various size bands, and the percentage in each band which reports to the underflow (oversize) discharge stream is measured. A graph is then drawn of the percentage in each band which reports to underflow (as ordinate, or Y-axis) versus the particle size range from the smallest to the largest (as abscissa, or X-axis). The smallest particles have the lowest percentage reporting to oversize. At the d50 point of the Y-axis, the slope of the resultant curve gives the alpha ($\alpha$) parameter. It is a comparative number which can be used to compare classifiers. The higher the value of the alpha parameter, the better the separation efficiency will be.

In these experimental results, the gas used is air, from a source of compressed air.

While the outlet gas slits 82 were of fixed width of 2.0 mm, the data in Table 1-1 demonstrates:

- a reduction in the amount of water bypassing (WBp) the hydrocyclone classification by ending up in the underflow stream. The percentage reduction in WBp is maximised (7.8%) when a gas inlet device 62A is located in a lowermost position at the hydrocyclone body, but there is still some improvement seen (a percentage reduction of 4.4%) when a gas inlet device 62, 62A is located in both a lowermost and an uppermost position at the hydrocyclone body.
- an increase in the amount of fine particles (Bpf) which bypassed the classification step by ending up in the underflow stream. This occurred when a gas inlet device 62, 62A was located at either of the lowermost position (an increase of 5.3%) or at the uppermost position (an increase of 18.9%) at the hydrocyclone body, which in both instances was an unhelpful outcome. The best scenario was no change in the Bpf (zero percentage change) when a gas inlet device 62, 62A was located in both a lowermost and an uppermost position at the hydrocyclone body.
- a reduction the average particle cut size (d50) in the overflow stream from the classification step. The percentage reduction in d50 is maximised (10.6%) when a gas inlet device 62, 62A was located in both a lowermost and an uppermost position at the hydrocyclone body, but some improvement was still observable (a percentage reduction of 5.0%) when a gas inlet device 62A was located only at a lowermost position at the hydrocyclone body.
- an increase in the $\alpha$ separation efficiency parameter when a gas inlet device 62, 62A was located at the lowermost position (an increase of 7.0%) which is helpful, but a decrease in the $\alpha$ separation efficiency parameter when a gas inlet device 62, 62A was located at the uppermost position at the hydrocyclone body (a decrease of 24.4%), which was an unhelpful outcome. There was no change in the $\alpha$ separation efficiency parameter (zero percentage change) when a gas inlet device 62, 62A was located in both a lowermost and an uppermost position at the hydrocyclone body.
- In summary, overall the best results were observed when a gas inlet device 62A was located in just the lowermost position at the hydrocyclone body, at which point there was a 7.8% reduction in the amount of water bypassing (WBp) the hydrocyclone and ending up in the underflow stream, a 5.0% reduction in the average particle cut size (d50) in the overflow stream, and a 7.0% increase in the $\alpha$ separation efficiency parameter.

Turning now to the effect of using outlet gas slits 82 of different widths of 0.3, 0.5 and 1.0 mm, the data in Table 1-2 demonstrates:

- a general improvement in all parameters—a reduction in the amount of water bypassing (WBp) the hydrocyclone classification; a reduction in the amount of fine particles (Bpf) which bypassed the classification step by ending up in the underflow stream; and a reduction the average particle cut size (d50) in the overflow stream from the classification step.

In summary, overall the best results in terms of consistent reductions in each of these parameters were observed when a gas inlet device 62A was located in only the lowermost position at the hydrocyclone body (first 3 lines of results in Table 1-2).

Furthermore, the best performance in each parameter occurred in that lowermost position when the outlet gas slit 82 was of 0.5 mm width. At this size of slit width, the water bypass (WBp) fell by 26.4%, the fines bypass (Bpf) fell by 14.1%, the average particle cut size (d50) fell by 18.1%, and the $\alpha$ separation efficiency parameter increased by 16.1%.

An outlet gas slit width of either 0.3 mm or of 1.0 mm produced poorer results than the outlet gas slit of 0.5 mm, although all of the results (when a gas inlet device 62A was located in only the lowermost position at the hydrocyclone body) for these slit diameters were still an improvement when compared with using other gas introduction locations in the cyclone, or no gas introduction at all.

The inventors believe that gas flowing into the cyclone separation chamber assists in the separation of fine particles from coarser particles by elutriation, and the results indicate that the best outcomes occur when (a) the gas is introduced at least into the lowermost position at the hydrocyclone body, and (b) the gas outlet gas slit in the gas inlet device is relatively small (around 0.5 mm and not, say, 1.0 mm or even 2.0 mm in width). The inventors believe that these parameters give rise to the formation of relatively smaller bubbles of lower buoyancy, and having a relatively long residence time to rise upwardly over the height of the hydrocyclone from the lowermost gas inlet.

The inventors have discovered that the use of the above embodiments of a hydrocyclone separation apparatus can realise optimum (and stable) operating conditions therein, and this physical configuration has been found to:
- promote better liberation of fine particles, and thus better recovery in a downstream flotation process, thereby maximising throughput; and
- minimise the recirculating load of particle material in the hydrocyclone underflow which is being returned to a milling step, and thus avoid overgrinding of particles, thus saving energy.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "upper" and "lower", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

The preceding description is provided in relation to several embodiments which may share common characteristics and features. It is to be understood that one or more features of any one embodiment may be combinable with one or more features of the other embodiments. In addition, any single feature or combination of features in any of the embodiments may constitute additional embodiments.

In addition, the foregoing describes only some embodiments of the inventions, and alterations, modifications, additions and/or changes can be made thereto without departing from the scope and spirit of the disclosed embodiments, the embodiments being illustrative and not restrictive. For example, the conical section of the hydrocyclone may be made up of more than two frustoconical segments, joined end-to-end. The means by which such frustoconical segments are joined to one another may not merely be via bolts and nuts positioned at the edges of terminal flanges, but by other types of fastening means, such as some type of external clamp. The materials of construction of the hydrocyclone body parts, whilst typically made of hard plastic or metal, can also be of other materials such as ceramics. The interior lining material of the hydrocyclone parts can be rubber or other elastomer, or ceramics, formed into the required internal shape geometry of the feed chamber 14 or the conical separating chamber 15, as specified herein.

Furthermore, the inventions have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the inventions. Also, the various embodiments described above may be implemented in conjunction with other embodiments, e.g., aspects of one embodiment may be combined with aspects of another embodiment to realise yet other embodiments. Further, each independent feature or component of any given assembly may constitute an additional embodiment.

The invention claimed is:

1. A hydrocyclone including:
   a body enclosing a separation chamber which is conical in shape and which extends axially from a first end to a second end of relatively smaller cross-sectional area than the first end; and
   the separation chamber including at least one gas inlet, said inlet comprising a plurality of openings arranged in a spaced-apart relationship from one another around an interior circumferential wall of said separation chamber, in use the openings providing for admission of gas into the separation chamber at a region located between the first and second ends;
   wherein the gas inlet comprises an annular gas receiving chamber; and
   wherein the gas inlet further comprises a gas discharge device which is in fluid communication with the gas receiving chamber and also with the separation chamber;
   the gas discharge device being annular in shape and having an interior circumferential wall with a plurality of openings formed therein, via which gas flows into the separation chamber in use, and
   wherein the openings of the gas discharge device are slits formed in the interior circumferential wall of the gas discharge device, and
   wherein the interior circumferential wall of the gas discharge device is aligned flush with an adjacent portion of the interior surface of the separation chamber.

2. The hydrocyclone according to claim 1, wherein the separation chamber comprises at least two sections of the body, and the at least one gas inlet is located between the sections.

3. The hydrocyclone according to claim 1, wherein the at least one gas inlet admits gas at the second end of the separation chamber.

4. The hydrocyclone according to claim 1, wherein the slits are elongate, and extend from the interior circumferential wall into the annular body of the gas discharge device.

5. The hydrocyclone according to claim 4, wherein each slit is arranged in parallel alignment with an adjacent slit.

6. The hydrocyclone according to claim 4, wherein an angle is defined between an axis of each elongate slit, and a radial line which extends from a point at the centre axis of the gas discharge device to a point at a terminal end of the slit which is located within the annular body.

7. The hydrocyclone according to claim 6, wherein said angle is an acute angle.

8. The hydrocyclone according to claim 7, wherein said angle is about 45 angle degrees.

9. The hydrocyclone according to claim 4, wherein each elongate slit is oriented at an angle such that, in use, when a flow of gas is discharged from the gas discharge device and into the separation chamber, the direction of discharge of said flow is aligned with a rotational, or spiral, flow of feed materials moving tangentially around the interior circumferential wall of the separation chamber.

10. The hydrocyclone according to claim 1, wherein at least some of said slits have parallel sides to define a constant transverse width.

11. The hydrocyclone according to claim 10, wherein the transverse width of said slits is equivalent to the width of said openings via which gas flows into the chamber in use.

12. The hydrocyclone according to claim 1, wherein the openings in the interior circumferential wall of the gas discharge device are arranged evenly spaced apart therearound.

13. The hydrocyclone according to claim 1, wherein the gas receiving chamber is operatively connected to a source of inlet gas.

14. The hydrocyclone according to claim 1, wherein the gas receiving chamber and the gas discharge device are positioned between two adjacent sections of the body by a pair of gaskets.

* * * * *